(No Model.) 2 Sheets—Sheet 1.
J. W. BODLEY.
HOISTING AND TRANSPORTING VEHICLE.
No. 594,722. Patented Nov. 30, 1897.
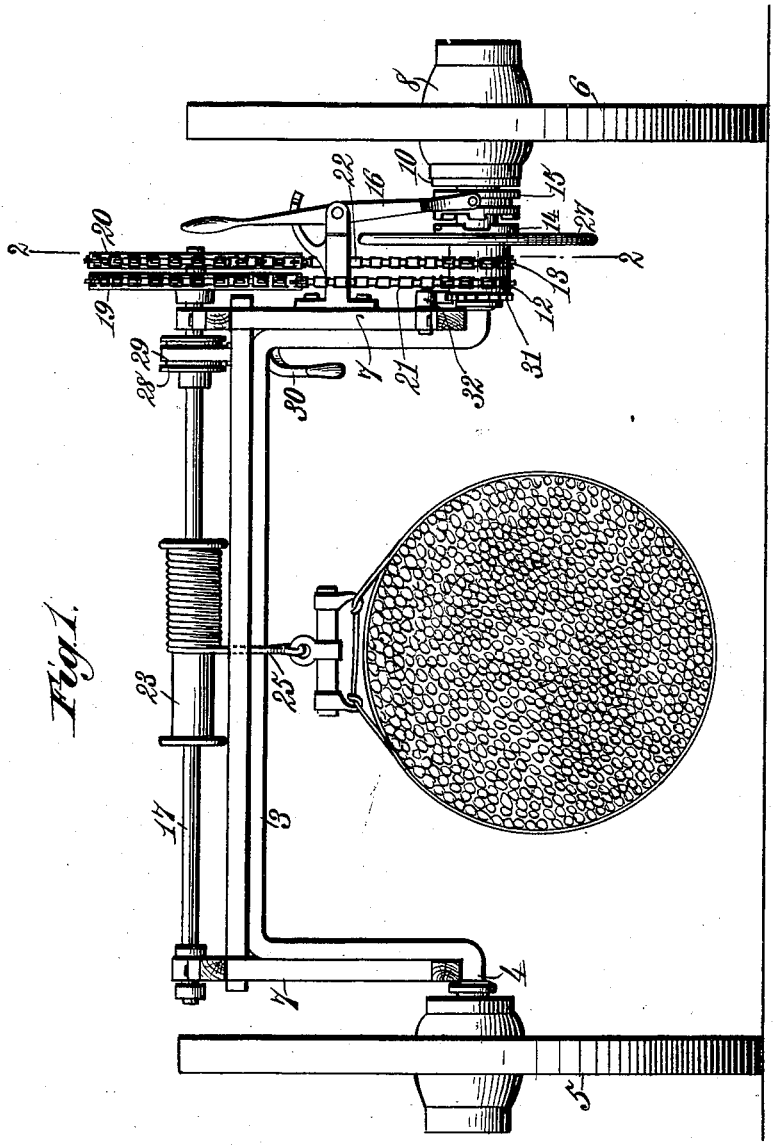
Witnesses.
Robert Everett.
H. B. Keefer.
Inventor.
James W. Bodley.
By James L. Norris.
Atty.

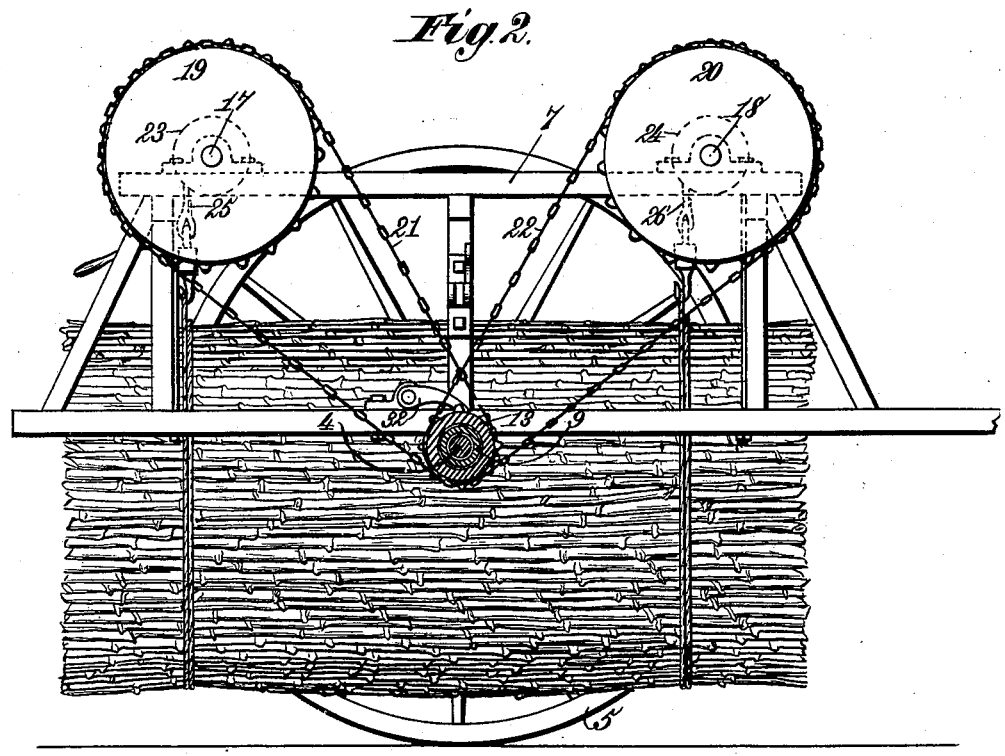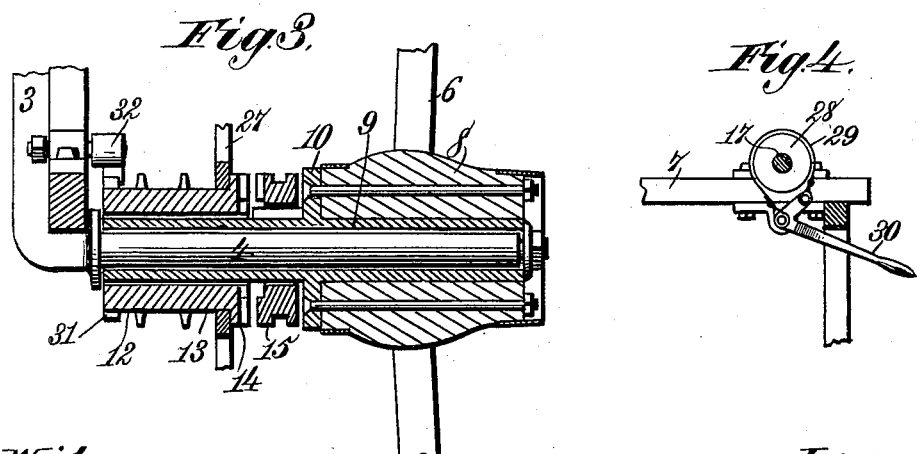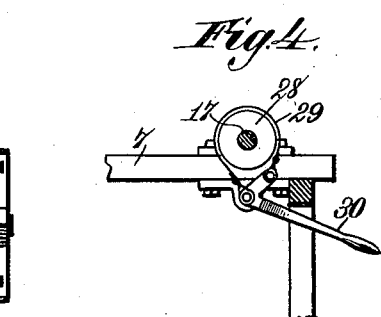

UNITED STATES PATENT OFFICE.

JAMES W. BODLEY, OF STAUNTON, VIRGINIA.

HOISTING AND TRANSPORTING VEHICLE.

SPECIFICATION forming part of Letters Patent No. 594,722, dated November 30, 1897.

Application filed June 21, 1897. Serial No. 641,673. (No model.)

*To all whom it may concern:*

Be it known that I, JAMES W. BODLEY, a citizen of the United States, residing at Staunton, in the county of Augusta and State of Virginia, have invented new and useful Improvements in Vehicles for Raising and Transporting Loads, of which the following is a specification.

This invention relates to carts or other wheeled vehicles designed for raising and transporting more or less bulky loads, such as bundles or packages or objects, particularly that class or type of vehicle wherein the load is automatically raised by the power of the draft animal or team moving the cart or vehicle forward.

The chief objects of the present invention are to provide new and improved means for transmitting motion from a wheel of the vehicle to windlasses by which hoisting-cables are operated; to provide new and improved means by which the power of the draft animal or team employed to move the vehicle is utilized to raise the load; to provide new and improved means for simultaneously rotating two cable-winding windlasses by the power of the draft animal or team, whereby it is possible to easily raise a comparatively heavy and bulky load and conveniently transport the same to the point desired; to provide new and improved means for raising the load either manually while the vehicle is motionless or automatically by the forward motion of the vehicle; to provide novel means for enabling the attendant or pilot to take up slack in the hoisting-cables after they are connected with the bundle or object preparatory to starting the team to raise and transport the bundle or object, and to provide novel and simple means for controlling or regulating the descent of the load when depositing it at the point desired.

To accomplish all these objects my invention consists in the features of construction and in the combination or arrangement of parts hereinafter described and claimed, reference being had to the accompanying drawings, in which—

Figure 1 is a sectional end elevation of a cart or wheeled vehicle embodying my invention. Fig. 2 is a sectional side elevation, the plane of section being on the line 2 2, Fig. 1. Fig. 3 is a detail sectional view through one of the wheel-hubs to clearly show the clutch and the chain wheels which impart motion to the windlasses, and Fig. 4 is a detail view of the brake.

In order to enable those skilled in the art to make and use my invention, I will now describe the same in detail, referring to the drawings, wherein—

The numeral 3 indicates an arched axle having end spindles 4, on which the supporting-wheels 5 and 6 are mounted. The arched axle supports a main frame 7, which may be of any construction suitable for the purpose in hand, and is provided at the front portion with thills or a tongue for the draft animal or team by which the vehicle is moved. The hub 8 of the wheel 6 is provided with a sleeve 9, fixed therein and secured thereto by a disk or plate 10, so that the sleeve is compelled to rotate on the axle-spindle when the wheel 6 is rotated. The sleeve constitutes a bearing for two loosely-mounted and rigidly-connected chain or sprocket wheels 12 and 13, one of which is provided with a clutch-section 14, with which a shiftable clutch-section 15 is adapted to be engaged through the medium of a clutch-lever 16 of any suitable construction.

The clutch-lever 16 may be of any form and be supported in any suitable manner, but as here shown it is pivoted to an arm or bracket extending from the main frame 7. The clutch-section 15 rotates with the sleeve 9, but is movable thereupon toward and from the clutch-section 14, which forms a part of or is connected with the duplex chain or sprocket wheel 12 13. The elevated or highest part of the main frame supports two transverse parallel shafts 17 and 18, mounted in suitable bearings and provided at one end with chain or sprocket wheels 19 and 20 of a diameter considerably greater than the chain or sprocket wheels 12 and 13 on the sleeve 9 of the wheel-hub 8. The chain or sprocket wheels 19 and 20 are operatively connected with the chain or sprocket wheels 12 and 13 through the medium of two chain belts 21 and 22. The shafts 17 and 18 are provided, respectively, with windlasses 23 and 24, rigidly mounted thereupon in any suitable manner—as, for instance, through the medium of feathers or keys, so that shafts and windlasses rotate in unison. The windlasses are provided, respectively, with hoisting-cables 25 and 26, designed to be engaged in any suitable manner with different portions of the bundle, package, or object which is to be raised and transported. The cable may be caused to engage a bundle, package, or object as shown in the drawings, so that when the windlasses are turned in the direction to wind the cables the bundle, package, or object will be raised, as will hereinafter appear. The two shafts on the main frame are placed the required distance apart, so that the cables of the windlasses may engage with opposite end portions of the bundle, package, or object which is to be moved by the vehicle.

The hub of the chain or sprocket wheel 13 is provided with an attached hand or pilot wheel 27, adapted to be manually operated by the attendant or pilot for the purpose of operating the chain or sprocket wheels and the chain belts while the clutch-section 15 is disengaged from the clutch-section 14. The hand or pilot wheel 27 enables the windlasses to be operated manually, if desired, and also enables the slack in the cables to be taken up after they have been engaged with the bundle, package, or object and before the clutch-section 15 is thrown into engagement with the clutch-section 14 preparatory to the draft animal or team moving the vehicle, as will more fully hereinafter appear. The shaft 17 or the shaft 18 is provided with an attached friction-disk 28, encircled by a brake-band 29, suitably connected with a pivoted operating hand-lever 30, Fig. 4, so that when the bundle, package, or object is to be lowered after it has been raised and carried to the point desired the speed of rotation of the windlasses can be controlled or regulated by operating the lever 30 to cause a braking action on the friction-disk 28. It is only essential to employ the brake mechanism described in connection with one of the shafts 17 or 18 because both shafts are connected by chain belts with the two connected chain or sprocket wheels 12 and 13, and obviously if the rotation of either shaft 17 or 18 be retarded the rotation of the other will also be retarded.

The chain-wheel 12 is provided with a ratchet-wheel 31, Figs. 3 and 4, adapted to be engaged by a pawl 32, pivoted to the main frame 7, so that as the chain-wheel is being rotated in the direction necessary to raise the load the reverse rotation of the chain-wheel is prevented if the pawl is engaged with the ratchet-wheel, and therefore when the load has been raised it will be held raised the required length of time by engagement of the pawl with the ratchet-wheel. When it is desired to lower the load, the pawl 32 is disengaged from the ratchet-wheel.

In the practical use of the improved load raising and transporting cart or vehicle the cables are engaged with bands or chains which encircle the load, as will be understood by reference to Fig. 1, and if any slack exists in the cables it can be taken up by turning the hand or pilot wheel 27 in the proper direction, after which the clutch-lever 16 is operated to throw the clutch-section 15 into engagement with the clutch-section 14, so that if the vehicle is being moved by the draft animal or team the rotary motion of the wheel 6 and sleeve 9 will be transmitted to the chain or sprocket wheels, the chain belts, and the shafts on which the windlasses are mounted, thereby winding the windlass-cables and raising the load. After the load has been raised to the desired height the clutch is thrown out of action and the load may be held suspended by engaging the pawl 32 with the ratchet-wheel 31. When the load is to be lowered, the pawl is disengaged from the ratchet-wheel and the brake-lever 30 is operated to control the speed of rotation of the shaft 17, thereby controlling or regulating the descent of the load, as will be obvious without further explanation.

By the employment of two windlasses, operated by one of the wheels through the medium of chain belts and sprocket-wheels, it is possible to easily raise comparatively heavy and bulky loads of greater or less length.

By the provision of the hand or pilot wheel 27 the raising mechanism may be operated manually and any slack existing in the hoisting-cables after they are connected with the load preparatory to starting the team to raise and transport the load may be taken up.

The brake mechanism is desirable in that it enables the descent of the load to be controlled or regulated by the attendant or pilot.

The present invention is particularly designed for raising and transporting bundles or packages of sugar-cane, but it may be used for raising and transporting various articles or objects, and therefore I do not wish to be understood as confining myself to any particular use of the mechanism constituting my invention.

Having thus described my invention, what I claim is—

1. The combination, in a load raising and transporting vehicle, of an axle having a spindle, a chain-wheel supported by the spindle, a vehicle-wheel by which the chain-wheel is rotated, a windlass-shaft journaled on the vehicle-frame, a windlass secured to the shaft and provided with a hoisting-cable, a chain-wheel on said shaft, and a chain belt connecting the chain-wheel on the axle-spindle with the chain-wheel on the windlass-shaft, substantially as described.

2. The combination, in a load raising and transporting vehicle, of an axle having a spindle, a sleeve rotatable on the spindle, a vehicle-wheel secured to the sleeve, a chain-wheel loosely mounted on the sleeve, a clutch for connecting the chain-wheel with the sleeve, a windlass-shaft journaled on the vehicle-frame, a windlass secured to the shaft and provided with a hoisting-cable, a chain-wheel on said shaft, and a chain belt connecting the chain-wheel on the sleeve with the chain-wheel on the windlass-shaft, substantially as described.

3. The combination, in a load raising and transporting vehicle, of an axle-spindle, a chain-wheel supported by the spindle, a vehicle-wheel by which said chain-wheel is rotated, a clutch between the wheel-hub and the chain-wheel on the axle-spindle, a shaft journaled on the vehicle-frame, a windlass secured to the shaft and provided with a hoisting-cable, a chain-wheel on said shaft, and a chain belt connecting the chain-wheel on the axle-spindle with the chain-wheel on the windlass-shaft, substantially as described.

4. The combination, in a load raising and transporting vehicle, of an axle having a spindle, a duplex chain-wheel supported by the spindle, a vehicle by which said duplex chain-wheel is rotated, a pair of windlass-shafts journaled on the vehicle-frame, windlasses secured to the shafts and provided with hoisting-cables, chain-wheels on said shafts, and chain belts connecting the duplex chain-wheels on the axle-spindle with the chain-wheels on the windlass-shafts, substantially as described.

5. The combination, in a load raising and transporting vehicle, of an axle having a spindle, a duplex chain-wheel supported by the spindle, a vehicle-wheel by which the said chain-wheel is rotated, a clutch interposed between the wheel-hub and the duplex chain-wheel, a pair of windlass-shafts journaled on the vehicle-frame, windlasses secured to the shafts and provided with hoisting-cables, chain-wheels on said shafts, and chain belts connecting the duplex chain-wheel on the axle-spindle with the chain-wheels on the windlass-shafts, substantially as described.

6. The combination, in a load raising and transporting vehicle, of an axle having a spindle, a main frame supported by the axle, a windlass-shaft journaled on the main frame and provided with a chain-wheel, a windlass secured to the windlass-shaft and having a hoisting-cable, a chain-wheel supported by the axle-spindle, a vehicle-wheel rotatable on the axle-spindle, a chain belt connecting the chain-wheel of the windlass-shaft with the chain-wheel supported by the axle-spindle, a clutch for throwing the chain-wheel on the axle-spindle into and out of operative connection with the vehicle-wheel, and means for turning the chain-wheel on the axle-spindle independent of the vehicle-wheel, substantially as described.

7. The combination, in a load raising and transporting vehicle, of an axle having a spindle, a main frame supported by the axle, a sleeve rotatable on the axle-spindle, a vehicle-wheel secured to the sleeve, a duplex chain-wheel loosely mounted on the sleeve, a clutch-section rotating with the sleeve and movable thereon into and out of engagement with the duplex chain-wheel, windlass-shafts journaled on the main frame and provided with chain-wheels, windlasses secured to the windlass-shafts and having hoisting-cables, chain belts connecting the chain-wheels of the windlass-shafts with the said duplex chain-wheel, a clutch for causing the duplex chain-wheel to rotate with the sleeve, and means for turning the duplex chain-wheel independent of the vehicle-wheel, substantially as described.

8. The combination, in a load raising and transporting vehicle, of a hoisting mechanism operated by the motion of one of the vehicle-wheels, a clutch mounted on the spindle of the wheel which operates the hoisting mechanism and having a part engaged with a part of said hoisting mechanism by which the hoisting mechanism is thrown into and out of operative connection with said vehicle-wheel, and a pilot-wheel on the movable part of said clutch for manually operating the hoisting mechanism independent of said vehicle-wheel, substantially as described.

9. The combination of a vehicle having wheels, one provided with a clutch-section, a load-hoisting mechanism comprising a movable clutch-section by which the hoisting mechanism is thrown into and out of operative connection with the clutch-section of the vehicle-wheel, and a hand or pilot wheel mounted directly upon the movable part of said clutch for manually turning the same to operate the hoisting mechanism when the latter is thrown out of operating connection with the vehicle-wheel and while the vehicle stands motionless, substantially as described.

10. The combination, in a load raising and transporting vehicle, of an axle having a spindle, a chain-wheel supported by the spindle, a vehicle-wheel by which the chain-wheel is rotated, a windlass-shaft journaled on the vehicle-frame, a windlass secured to the shaft and provided with a hoisting-cable, a chain-wheel on said shaft, a chain belt connecting the chain-wheels, and a brake mechanism in operative connection with the said windlass-shaft for controlling or regulating its motion in lowering the load, substantially as described.

In testimony whereof I have hereunto set my hand in presence of two subscribing witnesses.

JAMES W. BODLEY.

Witnesses:
  ANDREW HERO,
  JNO. J. WARD.